United States Patent [19]
Anikin et al.

[11] 3,717,926
[45] Feb. 27, 1973

[54] METHOD OF JOINING GRAPHITE ARTICLES

[76] Inventors: Leonid Trifonovich Anikin, Nizhegorodskaya ulitsa, 94, korpus 3, kv. 42; Gennady Alexandrovich Kravetsky, Novo-Basmannaya ulitsa, 4/6, kv. 201; Viktoria Sergeevna Dergunova, ulitsa Chaplygina, 13/2, kv. 85, all of Moscow; Valery Vasilievich Dutov, ulitsa Volkovskaya, 9, kv. 16, Ljubertsy Moskovskoi oblasti, all of U.S.S.R.

[22] Filed: Jan. 29, 1970

[21] Appl. No.: 6,950

[52] U.S. Cl. ................29/472.7, 29/472.9, 29/504
[51] Int. Cl. ..............................................B23k 31/02
[58] Field of Search........29/472.7, 504, 473.1, 472.9

[56] References Cited

UNITED STATES PATENTS

| | | | |
|---|---|---|---|
| 2,333,622 | 11/1943 | McNab | 29/473.1 X |
| 2,431,975 | 12/1947 | Yockey | 29/473.1 X |
| 2,979,814 | 4/1961 | Steinberg | 29/472.7 X |
| 2,979,813 | 4/1961 | Steinberg | 29/472.7 X |
| 3,097,931 | 7/1963 | Davidson et al. | 29/472.7 X |

FOREIGN PATENTS OR APPLICATIONS

| | | | |
|---|---|---|---|
| 695,470 | 10/1964 | Canada | 29/472.7 |

OTHER PUBLICATIONS

Robert F. Mehl, Consulting Editor, Constitution of Binary Alloys, 1958, pp. 374–375.

*Primary Examiner*—Charlie T. Moon
*Assistant Examiner*—Ronald J. Shore
*Attorney*—Waters, Roditi, Schwartz & Nissen

[57] ABSTRACT

A method of joining graphite articles in which a layer of metal is interposed between the surfaces of the articles to be joined, after which the joint area is heated to a temperature which is at least as high as the temperature at which a eutectic of the carbide of the metal and carbon is formed, or, alternatively, to a temperature somewhat higher than the said temperature whereby the resistance of the thus obtained joint to high temperature is considerably increased.

2 Claims, No Drawings

METHOD OF JOINING GRAPHITE ARTICLES

BACKGROUND OF THE INVENTION

1. Field of the Invention

The present invention relates to methods of joining graphite articles which can be widely used in heating appliances, in nuclear reactors, and in other apparatus, where graphite articles are employed.

2. Prior Art

There are known methods of joining graphite articles by bonding. According to these known methods, a layer of metal is placed between the surfaces of the articles to be joined, whereafter the joint area is heated either to the melting point of the metal or else to a temperature, at which the carbide of the metal is formed.

However, the joint produced by heating to the above specified temperatures, more often than not, does not have an adequate thermal resistance; for example, in cases when the joined articles are heated in use to temperatures in excess of 2,000° C., this inadequate thermal resistance results either from a considerable difference between the thermal expansion of the metal carbide interlayer and that of the graphite itself, or from the temperature, to which the articles are heated in use, exceeding the melting point of such interlayer.

It is, therefore, the main object of the present invention to provide a method of joining graphite articles, which ensures an increased thermal resistance of the joint to high temperatures, e.g., those in excess of 2,000° C.

SUMMARY OF THE INVENTION

Graphite articles are joined together by a method which comprises placing a layer of a metal between the surfaces of said graphite articles to be joined. The surfaces are brought into close, intimate engagement with each other, with said layer of metal interposed therebetween and the area of said engagement is heated to a temperature at which there is formed a eutectic of the carbide of said metal and carbon. Preferably, the temperature is 20°–50° C. higher than the lowest temperature at which the formation of said eutectic begins.

The temperature at which the eutectic is formed will vary with the metal used. Generally the temperature will be between about 1,320° C. and about 2,450° C.

The metal may be for instance molybdenum, yttrium, boron, etc.

DETAILED DESCRIPTION OF THE INVENTION

In order to achieve the objects set forth above, the method according to the present invention has been completed. According to the invention, there is provided a method of joining graphite articles, according to which a layer of a metal is placed between the surfaces of at least two graphite articles which are to be joined, after which the joint area is heated. In the method, said heating is effected to a temperature which is not below the point at which there is formed a eutectic of the carbide of said metal and carbon.

It is preferred, in order to attain a higher quality of the joint, to heat said joint area to a temperature which is 20° to 50° C. higher than the initial point at which said eutectic of the carbide of the metal and carbon starts being formed.

The present invention is practiced in the following manner. A layer of metal, which can be considered as a filler metal, is placed between the surfaces of the graphite articles, which are to be joined, after which the area of the joint is heated. Any metal which is capable of forming, when heated together with graphite, a liquid eutectic phase containing the carbide of this metal and carbon can be used as the filler metal.

For example, the following metals can be used, as the filler metal: molybdenum, having a eutectic melting point of 2,450° C.; yttrium (2,400° C. eutectic melting point); boron (2,150° C. eutectic melting point), and several others.

The area where the surfaces of the articles to be joined are brought together, with a layer of a filler metal interposed therebetween is heated to a temperature at which the eutectic of the carbide of this metal and carbon is formed.

As the joint area is being thus heated, there are crystallized therein graphite grains, which are derived from both articles being joined, while the structure of the joint area changes from that of a purely carbide structure to a mixed one, containing both the carbide and graphite.

The filler metal acts here as an intermediary element promoting the generation of eutectic carbon, whereby joints capable of operating at high temperatures are produced.

With graphite predominating in the joint area, and with a strictly carbide structure not being present there, the thermal stability of the joint is increased, whereas the physical and mechanical characteristics of the bonded joint approach those of the material proper, i.e. those of graphite.

In order to obtain uniform heating across the whole area of the superimposed surfaces of the articles being joined, which is particularly important in the case of large articles and those having an intricate configuration, it has been found expedient to effect the heating to a temperature which is 20° to 50° C. higher than the lowest point at which a eutectic of the carbide of the metal and carbon starts being formed, i.e. 20° to 50° C. higher than the initial eutectic point.

For a better understanding of the present invention, there are given below several examples of performing the method of the present invention.

EXAMPLE 1

Two cylinder-shaped articles of graphite having a specific gravity of 1.9 gr/cu.cm. are to be butt-jointed. For the filler metal, molybdenum is used. Molybdenum forms a molybdenum carbide - carbon eutectic at 2,450° C. The butts of the two articles are pressed together with a force of 0.3 kg per sq.mm, with an 0.3 mm thick leaf of molybdenum foil interposed therebetween; then the joint area is heated for 2.5 min. to 2,470° C. in an inert gas protective atmosphere. A microphotographic analysis of the butt joint thus formed shows that the joint area has no distinct borders any longer. A tensile strength test at 2,000° C. on the other hand, has demonstrated that the strength of the bonded joint is about the strength of the material proper, i.e. of graphite. Although at 2,800° C. the tensile strength of the joint was about 50 to 60 percent the strength of the graphite material proper, however, even this strength, i.e. 115 to 155 kg/sq.cm, is considered to be quite sufficient for operation of graphite articles under high temperatures, i.e. temperatures above 2,000° C..

Considering that the melting point of molybdenum carbides do not exceed 2,700° C. it could have been presumed that a test sample should break easily at 2,800° C. However, this does not occur, which fact demonstrates that the molybdenum interlayer acts solely as an intermediary element, whereas actual joining of the articles takes place on account of the formation of graphite grains which develop themselves from the molybdenum carbide - carbon liquid phase.

The results of tests show that it is possible to bring down the bonding temperature without affecting the thermal stability of the joint at high temperatures.

From the above it is seen that the present invention makes it possible to obtain graphite joints having an increased stability at high temperatures.

Moreover, it has been made clear that it is also practicable to bring down the joining temperature by using relatively low-melting metals as filler metals without noticably affecting the thermal stability of the joints.

The above specified advantages of the present invention can be exploited to good advantage in nuclear technology, where one of the essential requirements is that the joint area should not differ from the material proper; as well as in cases of joining large-size articles; e.g. sheets, where the necessity of heating large portions of the sheets to be joined to a high temperature has long been a limiting factor.

What is claimed is:

1. A method of joining at least two graphite articles comprising the steps of placing a layer of a metal selected from the group consisting of molybdenum, yttrium and boron between the surfaces of said graphite articles; bringing areas of said surfaces into an intimate engagement with said layer of metal interposed therebetween; and heating the areas of said engagement to a temperature at which a eutectic of the carbide of said metal and carbon is formed to join the articles.

2. A method as claimed in claim 1 wherein said heating is effected to a temperature which is 20° to 50° C. higher than the lowest point at which said eutectic of said carbide of said metal and carbon starts being formed.

* * * * *